United States Patent
Goade, Sr.

[11] Patent Number: 6,109,439
[45] Date of Patent: Aug. 29, 2000

[54] DATA CARD SECURITY DISPLAY PACKAGING

[76] Inventor: Ron E. Goade, Sr., 3101 Castlerock, Edmond, Okla. 73013

[21] Appl. No.: 09/216,461

[22] Filed: Dec. 18, 1998

[51] Int. Cl.⁷ .................................................. B65D 75/00
[52] U.S. Cl. ............................................ 206/454; 206/37
[58] Field of Search ........................... 206/449, 555, 206/454, 455, 38, 37, 307

[56] References Cited

U.S. PATENT DOCUMENTS

| | | | |
|---|---|---|---|
| 3,152,901 | 10/1964 | Johnson | 96/43 |
| 3,413,171 | 11/1968 | Hannon | 156/277 |
| 3,417,497 | 12/1968 | Hannon | 40/2.2 |
| 3,674,622 | 7/1972 | Plasse | 161/160 |
| 3,716,439 | 2/1973 | Maeda | 165/269 |
| 4,589,687 | 5/1986 | Hannon | 283/94 |
| 4,986,868 | 1/1991 | Schmidt | 156/249 |
| 5,609,253 | 3/1997 | Goade, Sr. | 206/449 X |
| 5,740,915 | 4/1998 | Williams | 206/555 |
| 5,760,381 | 6/1998 | Stich et al. | 235/380 |
| 5,791,474 | 8/1998 | Hansen | 206/449 |
| 5,842,629 | 12/1998 | Sprague et al. | 206/449 X |
| 5,921,584 | 7/1999 | Goade, Sr. | 283/107 |

*Primary Examiner*—Jacob K. Ackun
*Attorney, Agent, or Firm*—Dunlap, Codding & Rogers, P.C.

[57] ABSTRACT

A packaging and method for displaying a data card. The packaging comprising a paper covering coated on one side thereof with a layer of polyethylene. The data card is positioned between a first cover portion of the covering and a second cover portion of the covering. The first cover portion is bonded to the second cover portion, and the first and second cover portions are bonded to the outer surface of the data card via the layer of polyethylene of the first and second cover portions whereby the data card is sealed between the first and second cover portions in a non-sliding relationship relative to the first and second cover portions such that unauthorized tampering with the paper covering to gain access to the data card is readily detectable.

23 Claims, 3 Drawing Sheets

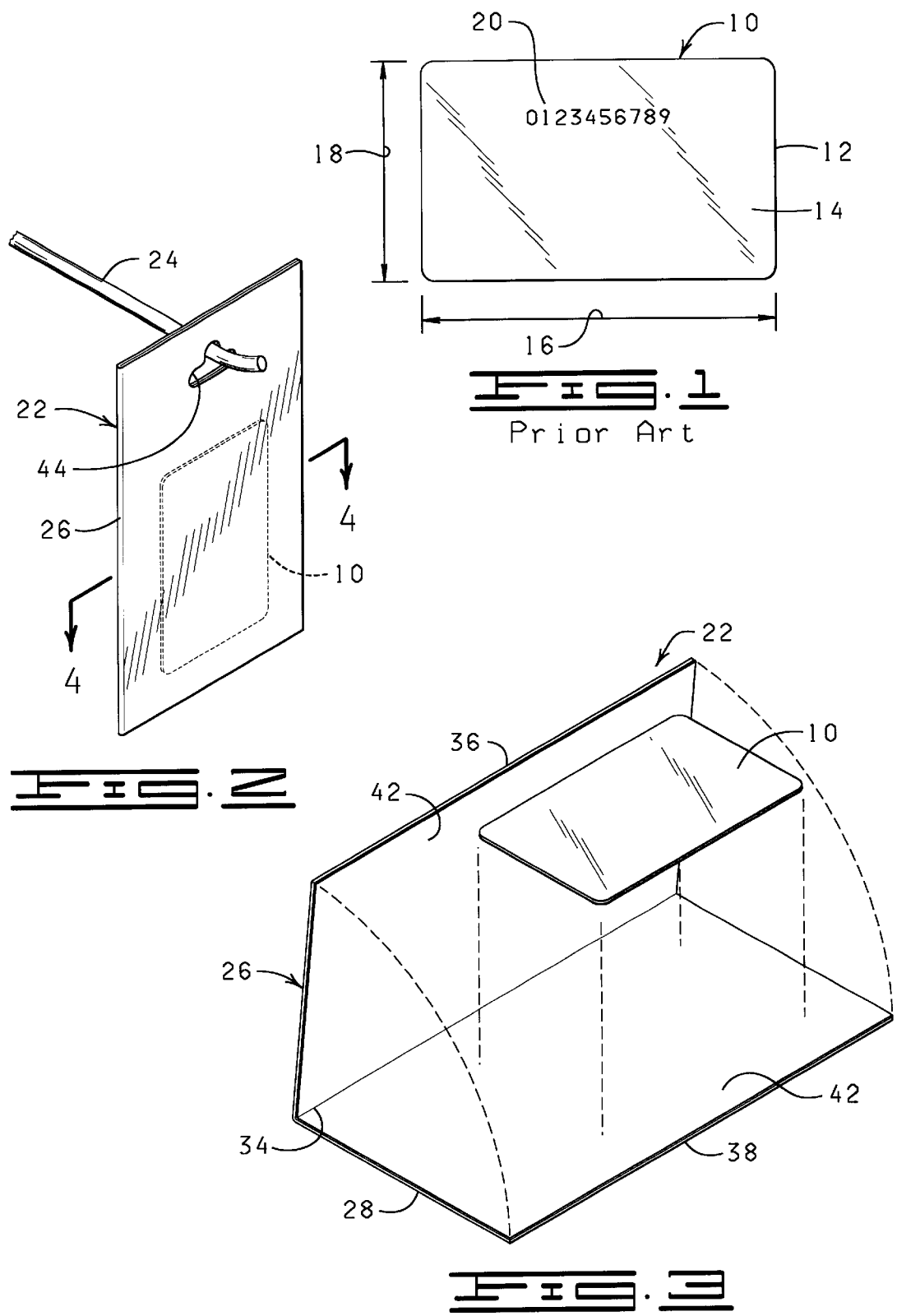

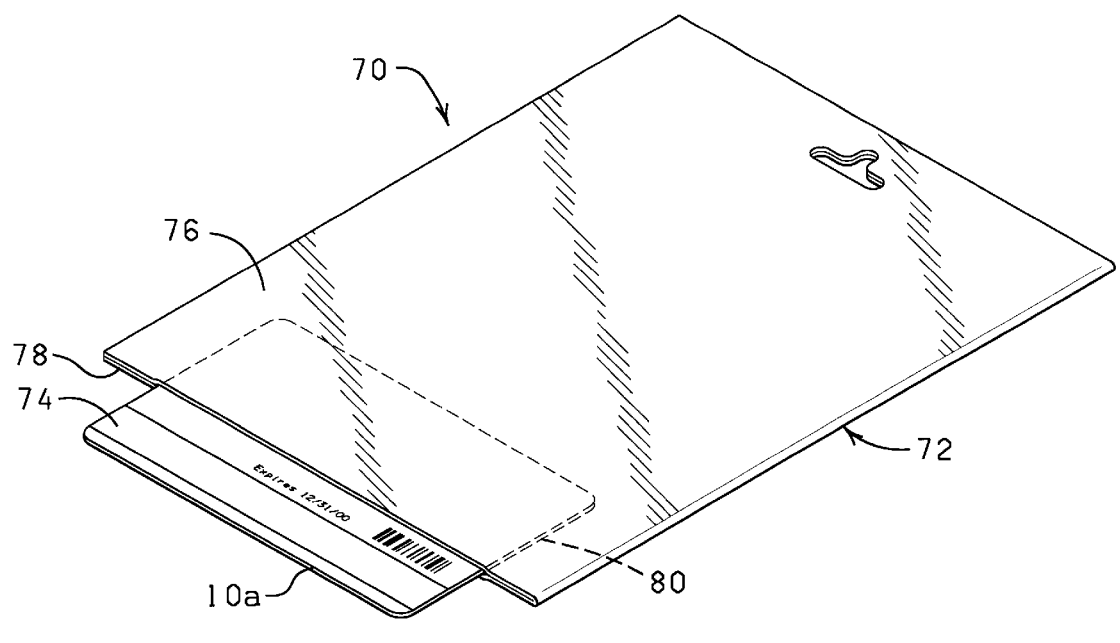

DATA CARD SECURITY DISPLAY PACKAGING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention.

The present invention relates generally to packaging, and more particularly, but not by way of limitation, to an improved security packaging for displaying an information card.

2. Brief Description of Related Art.

The purchase and usage of data or information cards has continued to increase in recent years to the point that the sale of data cards today is a multi-billion dollar industry. Often data cards are printed and issued with a predetermined balance and typically sold as a retail item. An example of such a card is a prepaid calling card which provides an individual with a set dollar amount of long distance telephone calls. The account is accessed and debited by using an account number provided on the calling card.

In addition to the increased purchasing of data cards has come increased security problems. More specifically, when selling prepaid data cards as a retail item they are being displayed at the point of purchase in such a manner that access to the account numbers can be inconspicuously gained, and in turn used, without significantly damaging the packaging in which the card is displayed.

Another problem experienced in the sale of such debit cards is that merchants selling these cards are subsequently more exposed to loss through theft. In addition, the merchant must maintain inventory stock of different values of these debit cards well in advance of when the debit cards are actually sold as a retail item, thus restricting working capital.

With these problems in mind, merchants have begun to display non-activated (zero balance) debit cards whereby the merchant no longer has a large initial expenditure since the non-activated debit cards have no initial intrinsic value, and thus, theft is no longer a concern since the non-activated debit cards have very little value. Upon purchase of the debit card, the merchant encodes the debit card with a balance representing an amount a consumer wishes to attribute to the debit card. In light of the fact that the consumer must have the card encoded after the card is purchased, it is desirable to the merchant to be able to encode the card without having to first remove the card from packaging in which the card is displayed.

To this end, a need exists for an improved security packaging for displaying a data card having coded data disposed thereon at the point of purchase. It is to such an improved security packaging that the present invention is directed.

BRIEF SUMMARY OF THE INVENTION

The present invention is directed to a data card security package which includes a data card and a paper covering. The paper covering includes a first cover portion and a second cover portion. Each of the first and second cover portions has a first side, a second side, and a layer of polyethylene disposed on one of the first side and the second side. The first cover portion overlaps at least a portion of the second cover portion so as to form a data card receiving envelope with the layer of polyethylene of the first and second cover portions positioned adjacent each other. At least a portion of the data card is positioned between the first cover portion and the second cover portion with the outer surface of the data card engaging the layer of polyethylene of the first cover portion and the second cover portion and the coded data positioned against one of the first and second cover portions. The first cover portion is bonded to the second cover portion, and the first and second cover portions are bonded to the outer surface of the data card via the layer of polyethylene of the first and second cover portions whereby the data card is sealed between the first and second cover portions in a non-sliding relationship relative to the first and second cover portions such that unauthorized tampering with the paper covering to gain access to the data card is readily detectable.

In another aspect, the present invention is directed to a method of packaging a data card. The method includes the steps of:

(1) providing a paper covering including a first cover portion and a second cover portion, each of the first and second cover portions having a first side, a second side, and a layer of polyethylene disposed on one of the first side and the second side;

(2) positioning at least a portion of the data card between the first cover portion and the second cover portion with the first cover portion overlaying at least a portion of the second cover portion and the layer of polyethylene of the first and second cover portions positioned adjacent each other; and (3) bonding the first cover portion to the second cover portion and the first and second cover portions to the outer surface of the data card via the layer of polyethylene of the first and second cover portions whereby the data card is sealed between the first and second cover portions in a non-sliding relationship relative to the first and second cover portions such that unauthorized tampering with the paper covering to gain access to the data card is readily detectable.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 1 is a back plan view of a conventional data card.

FIG. 2 is a perspective view of a data card security package constructed in accordance with the present invention.

FIG. 3 is an exploded view of the data card security package of FIG. 2.

FIG. 7 is a front view of another embodiment of a data card security package constructed in accordance with the present invention.

DETAILED DESCRIPTION OF THE INVENTION

Figure 4:
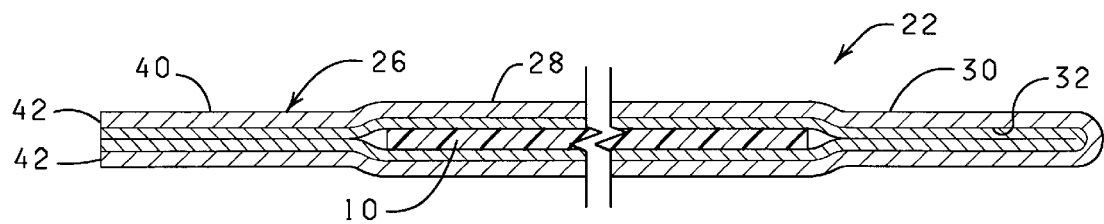
FIG. 4 is a cross sectional view of the data card security package of the present invention taken along line 4—4 in FIG. 2.

Referring now to the drawings, and more particularly to FIG. 1, a data card 10 having a first side 12, a second side 14, a length 16, and a width 18 is illustrated. The data card 10 is provided with coded data 20 on the first side 12 or the second side 14 thereof. The coded data 20 is illustrated as being disposed on the second side 14 of the data card 10 in FIG. 1. The coded data 20 is further illustrated as being in the form of an account number or personal identification number which is utilized by an individual to charge the purchase goods or services to a prepaid account. It will be appreciated, however, that the coded data 20 may also be in the form of a magnetic stripe, as illustrated in FIG. 7, which contains information which is readable by a suitable card reader.

Data cards can be constructed of various materials from all paper, all plastic, and paper laminated with plastic, for example. Numerous methods are known in the art for forming data cards. For example, one method of forming a laminated data card involves passing a sheet of flexible material through a non-variable printing station where non-variable data of the data card, which may include, for example, art work, instructional information to explain how to use the data card, and promotional information related to the establishment distributing the data card. The non-variable data can be disposed on each side of the sheet of material. The sheet of material is next passed through a variable printing station where variable data, which may include an account number, encoded data and bar codes, is printed on the sheet of material.

After the variable data has been printed on the sheet of material, the sheet of material is passed through a laminating station where each side of the sheet of material is laminated with a suitable plastic material, such as polyester/polyethylene or polyvinyl chloride, in a conventional manner.

The laminated sheet of material is then passed through a cutting die and perforating station where the laminated sheet of material is cut to the desired size, for example, the size and shape of a conventional credit type card. However, it will be appreciated that the data card can be formed into a variety of shapes and sizes. With the data card sized and shaped, the data card is passed through a magnetic stripe applicator and encoder station to apply and encode the magnetic stripe, if applicable.

Data cards and the use of same, as described hereinabove, are well known in the art. Thus, no further description of the types of, uses for, and methods of making data cards is believed necessary in order to enable one skilled in the art to understand the present invention.

FIG. 2 shows a data card security package 22 constructed in accordance with the present invention hanging from a display peg 24. The security package 22 includes the data card 10 encompassed within a covering 26 in such a manner that the coded data 20 on the data card 10 is masked and the data card 10 is sealed within the covering 26 whereby the covering 26 must be significantly destroyed to gain access to the coded data 20 of the data card 10.

As best shown in FIGS. 3 and 4, the covering 26 is constructed of a sheet of paper 28, such as a card stock, having an opaque characteristic and which is capable of receiving printed matter, such as art work and the name of the product and the distributor. The sheet of paper 28 has a first side 30 and a second side 32. The sheet of paper 28 is illustrated herein as having a rectangular configuration; however, it will be appreciated that the sheet of paper can be formed into any other desired geometric shape.

The covering 26 may be constructed of a single layer of paper or a plurality of layers of the same or different types of materials. Any thickness of the covering 26 may be utilized in accordance with the present invention so long as at least a portion of the covering 26 is opaque so that the coded data 20 disposed on the data card 10 is not visible through the covering 26 when the data card 10 is sealed in the packaging 22 in a manner described below. However, it is preferred that the sheet of paper 28 of the covering 26 have a thickness in a range of about 5 mils to 30 mils.

As illustrated in FIG. 3, the sheet of paper 28 is folded about the data card 10 along a line 34 so as to define a first cover portion 36 for covering one side of the data card 10 and a second cover portion 38 for covering the opposite side of the data card 10. The first cover portion 36 is sized so that the first cover portion 36 covers one side of the data card 10 and extends outwardly from the peripheral edge of the data card 10 such that a sufficient surface area of the first cover portion 36 remains exposed about the data card 10 when the data card 10 is positioned on the first cover portion 36. Likewise, the second cover portion 38 is sized so that the second cover portion 38 covers the opposite side of the data card 10 and extends outwardly from the peripheral edge of the data card 10 such that a sufficient surface area of the second cover portion 38 remains exposed about the data card 10 when the data card 10 is positioned on the second cover portion 38. Thus, the sheet of paper 28 is dimensioned so that a border 40 (FIG. 4) is formed about the peripheral edge of the data card 10 that has sufficient surface area when the data card 10 is positioned on the covering 26 to enable the first cover portion 36 to be sealed to the second cover portion 38 with the data card 10 positioned therebetween.

To effect a tamper detectable seal between the first and second cover portions 36 and 38 and between the covering 26 and the data card 10, the sheet of paper 28 is coated with a layer of a suitable thermoplastic material, such as a low density polyethylene 42. In a preferred manner, the sheet of paper 28 is corona treated and extrusion coated with a thin layer of low density polyethylene. The extrusion coating process generally involves feeding low density polyethylene pellets into a barrel and screw extruder which melts the pellets under high pressure and heat. The melted low density polyethylene is then extruded through a slot die onto one side of the sheet of paper 28. The layer of polyethylene 42 is preferably formed on the sheet of paper 28 to have a thickness in a range of from about 0.5 mils to about 2 mils. However, the layer of polyethylene 42 may be formed on the sheet of paper 28 to have a thickness in a range of from about 0.5 mils to about 10 mils. In a preferred form for this purpose, the polyethylene has a density between about 0.910 and 0.930 g/cc and a melt point in a range from about 200° F. to about 300° F., but more preferably in a range of from about 220° F. to 250° F.

While it is preferred that the first cover portion 36 and the second cover portion 38 be formed as a single piece construction, it will be appreciated that the first cover portion 36 and the second cover portion 38 may be separate pieces. It is also preferred that the layer of polyethylene 42 be applied to the first and second cover portions 36 and 38 of the covering 26. However, it will be appreciated that an effective seal may be formed by applying the polyethylene to either the first cover portion 36 or the second cover portion 38.

To package the data card 10, the covering 26 is folded to form the first and second cover portions 36 and 38. The data card 10 is then positioned between the first and second cover portions 36 and 38 of the covering 26 with data card 10 engaging a portion of the layer of polyethylene 42 of the first cover portion 36 and the second cover portion 38. Heat is next applied to the covering 26 to soften the polyethylene to effect a bond between the overlapping portions of the first and second cover portions 36 and 38, between the first cover portion 36 and the adjacent side of the data card 10 the second cover portion 38 and the side of the data card 10 adjacent thereto. The polyethylene is heated to a range of about 225° F. to 400° F. It will be appreciated that in this range of temperatures, the polyethylene will create an effective bond without affecting the shape or integrity of the plastic coated data card 10.

The use of polyethylene to effect the bond between the first and second cover portions 36 and 38 and between the first and second cover portions 36 and 38 and the data card 10 provides the advantage of providing a non-resealable or tamper detectable seal without damaging the data card 10 as can result from use of a pressure sensitive or heat activated adhesive that can leave an undesirable adhesive residue on the data card upon removal of the data card from the covering.

When the data card 10 is sealed in the covering 26, the coded data 20 positioned against the opaque covering 26 is sufficiently masked and the data card 10 is secured in the covering 26 in a nonsliding relationship relative to the covering 26 whereby the covering 26 must be substantially mutilated to gain access to the coded data 20 on the data card 10.

The covering 26 can be provided with a hole 44 (FIG. 2) near one end thereof to enable the data card security package 22 to be displayed from the peg 24 or other similar device.

Although not shown, the covering 26 can be provided with perforations or some other form of a tear line to aid in the removal of the data card 10 from the packaging 22. Otherwise, the data card 10 is removed from the covering 26 simply by tearing or cutting the covering 26 away from the data card 10.

Figure 5:
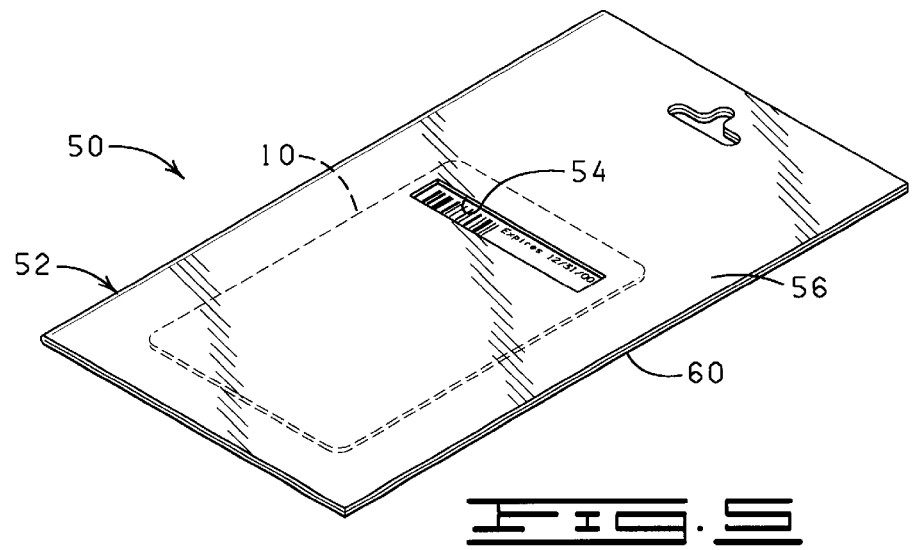
FIG. 5 is a front view of another embodiment of a data card security package constructed in accordance with the present invention.
Figure 6:
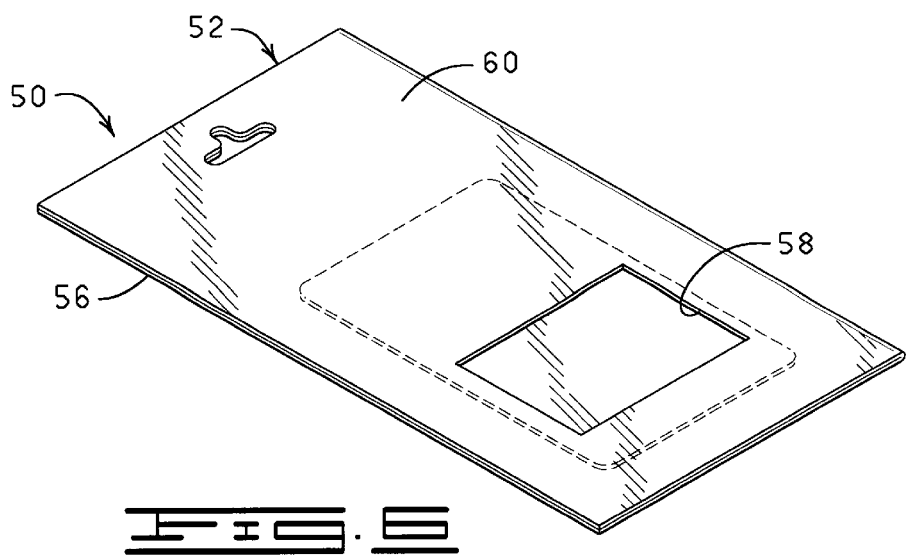
FIG. 6 is a rear view of the data card security package of FIG. 5.

FIGS. 5 and 6 illustrate another embodiment of a data card security package 50 constructed in accordance with the present invention. The data card security package 50 includes the data card 10 and a covering 52. The covering 52 is substantially similar to the covering 26 described above except the covering 52 is provided with a first aperture 54 on a first cover portion 56 and a second aperture 58 on a second cover portion 60. The apertures 54 and 58 serve the purpose of permitting an individual to observe the contents of the covering 52. More specifically, the first aperture 54 may be positioned to permit inspection of the art work of the data card 10, and the second aperture 58 may be positioned and utilized to expose a bar code or other information, such as the expiration date.

FIG. 7 illustrates yet another embodiment of a data card security package 70 constructed in accordance with the present invention. The data card security package 70 includes a data card 10a and a covering 72.

The data card 10a is provided with an encodable magnetic stripe 74 on at least one side thereof. The magnetic stripe 74 is applied to the data card 10a so that the magnetic stripe 74 extends transversely across the data card 10a proximate one end thereof.

The covering 72 is substantially similar to the covering 26 described above. However, the data card 10a is sealed between a first cover portion 76 and a second cover portion 78 such that a portion of the data card 10a projects from the covering 72. More specifically, an upper portion 80 of the data card 10a is positioned between the first and second cover portions 76 and 78 of the covering 72 and sealed therebetween in the same manner as described above in reference to the data card security package 22. The remaining portion of the data card 10a extends beyond the peripheral edges of the covering 70, as illustrated in FIG. 7, such that the magnetic stripe 74 is exposed. It will be appreciated that this unique arrangement securely seals the data card 10a in the covering 72 for display and enables the data card 10a to be swiped through an encoding device (not shown) to encode the magnetic stripe 74 without having to first remove the data card 10a from the covering 72.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A data card security package, comprising:
   a data card having an outer surface fabricated of a polymeric material and coded data disposed on at least one side thereof;
   a covering constructed of paper, the covering including a first cover portion and a second cover portion, each of the first and second cover portions having a first side, and a second side, at least one of the first and second cover portions having a layer of polyethylene disposed on one of the first side and the second side, the first cover portion overlaying at least a portion of the second cover portion, at least a portion of the data card positioned between the first cover portion and the second cover portion with the polymeric outer surface of the data card engaging the layer of thermoplastic material and the coded data positioned against one of the first and second cover portions such that the coded data of the data card is masked from view, the first cover portion bonded to the second cover portion via the layer of thermoplastic material so as to form a non-resealable seal between the first cover portion and the second cover portion such that unauthorized tampering with the covering to gain access to the data card is readily detectable and at least one of the first and second cover portions bonded to the outer surface of the data card via the layer of thermoplastic material so as to form a non-resealable seal between the data card and the covering, the seal between the data card and the covering being such that the layer of thermoplastic material peels from the outer surface of the data card so as to leave no portion of the layer of thermoplastic material on the outer surface of the data card upon opening the covering and removing the data card from the covering.

2. The package of claim 1 wherein the polyethylene has a density in a range of from about 0.910 to about 0.930 g/cc.

3. The package of claim 1 wherein the layer of polyethylene has a thickness about from about 0.5 mils to about 2 mils.

4. The package of claim 1 wherein the data card is totally encompassed within the paper covering.

5. The package of claim 1 wherein the data card has a portion thereof projecting from the paper covering and the data card has an encodable magnetic stripe extending transversely across the portion of the data card projecting from the paper covering.

6. The package of claim 1 wherein the data card is totally encompassed within the paper covering.

7. The package of claim 1 wherein the data card has a portion thereof projecting from the paper covering and the data card has an encodable magnetic stripe extending transversely across the portion of the data card projecting from the paper covering.

8. A data card security package, comprising:
a data card having an outer surface fabricated of a polymeric material;
a covering constructed of paper, the covering including a first cover portion and a second cover portion formed as a single piece construction, each of the first and second cover portions having a first side, a second side, and a layer of polyethylene disposed on one of the first side and the second side, the first cover portion overlaying at least a portion of the second cover portion so as to form a data card receiving envelope with the layer of polyethylene of the first and second cover portions positioned adjacent each other, at least a portion of the data card positioned between the first cover portion and the second cover portion with the polymeric outer surface of the data card engaging the layer of polyethylene bonding material of the first cover portion and the second cover portion, the first cover portion bonded to the second cover portion via the layer of polyethylene of the first and second cover portions so as to form a non-resealable seal between the first cover portion and the second cover portion such that unauthorized tampering with the covering to gain access to the data card is readily detectable and the first and second cover portions bonded to the polymeric outer surface of the data card via the layer of polyethylene of the first and second cover portions so as to form a non-resealable seal between the data card and the covering, the seal between the data card and the covering being such that the laver of polyethylene peel from the outer surface of the data card so as to leave no portion of the layers of polyethylene on the polymeric outer surface of the data card upon opening the covering and removing the data card from the covering.

9. The package of claim 8 wherein the polyethylene has a density in a range of from about 0.910 to about 0.930 g/cc.

10. The package of claim 8 wherein the layer of polyethylene has a thickness about from about 0.5 mils to about 2 mils.

11. The package of claim 8 wherein the data card is totally encompassed within the paper covering.

12. The package of claim 8 wherein the data card has a portion thereof projecting from the paper covering and the data card has an encodable magnetic stripe extending transversely across the portion of the data card projecting from the paper covering.

13. A method of packaging a data card having an outer surface fabricated of a polymeric material, comprising the steps of:
providing a covering constructed of paper, the covering including a first cover portion and a second cover portion, each of the first and second cover portions having a first side and a second side, at least one of the first and second cover portions having a layer of polyethylene disposed on one of the first side and the second side;
positioning at least a portion of the data card between the first cover portion and the second cover portion with the first cover portion overlaying at least a portion of the second cover portion and the polymeric outer surface of the data card engaging the layer of polyethylene; and
bonding the first cover portion to the second cover portion via the layer of polyethylene so as to form a non-resealable seal between the first cover portion and the second cover portion such that unauthorized tampering with the covering to gain access to the data card is readily detectable and bonding at least one of the first and second cover portions to the polymeric outer surface of the data card via the layer of polyethylene so as to form a non-resealable seal between the data card and the covering, the seal between the data card and the covering being such that the layer of polyethylene peels from the outer surface of the data card so as to leave no portion of the layer of polyethylene on the polymeric outer surface of the data card upon opening the covering and removing the data card from the covering.

14. The method of claim 13 wherein the layer of polyethylene is formed on the covering has a density in a range of from about 0.910 to about 0.930 g/cc.

15. The method of claim 13 wherein the layer of polyethylene is formed on the cover to have a thickness about from about 0.5 mils to about 2 mils.

16. The method of claim 13 wherein the data card is totally encompassed within the paper covering.

17. The method of claim 13 wherein the data card has an encodable magnetic stripe extending transversely across a portion thereof and wherein the data card is positioned between the first and second cover portion such that the portion of the data card having the encodable magnetic stripe is projecting from the covering.

18. A method of packaging a data card having an outer surface fabricated of a polymeric material, comprising the steps of:
providing a covering constructed of paper, the covering having a layer of polyethylene disposed on one side thereof;
folding the covering to form a first cover portion and a second cover portion;
positioning at least a portion of the data card between the first cover portion and the second cover portion with the first cover portion overlaying at least a portion of the second cover portion and the polymeric outer surface of the data card engaging the layer of polyethylene; and
heating the layer of polyethylene to cause the first cover portion to bond to the second cover portion so as to form a non-resealable seal between the first cover portion and the second cover portion such that unauthorized tampering with the covering to gain access to the data card is readily detectable and to bond at least one of the first and second cover portions to the polymeric outer surface of the data card so as to form a non-resealable seal between the data card and the covering, the seal between the data card and the covering being such that the layer of polyethylene peels from the outer surface of the data card so as to leave no portion of the layer of polyethylene on the polymeric outer surface of the data card upon opening the covering and removing the data card from the covering.

19. The method of claim 18 wherein the layer of polyethylene is formed on the covering has a density in a range of from about 0.910 to about 0.930 g/cc.

20. The method of claim 18 wherein the layer of polyethylene is formed on the cover to have a thickness about from about 0.5 mils to about 2 mils.

21. The method of claim 18 wherein the polyethylene is heated to a temperature in a range of 225° F. to 400° F.

22. The method of claim 18 wherein the data card is totally encompassed within the paper covering.

23. The method of claim 19 wherein the data card has an encodable magnetic stripe extending transversely across a portion thereof and wherein the data card is positioned between the first and second cover portion such that the portion of the data card having the encodable magnetic stripe is projecting from the covering.

* * * * *

UNITED STATES PATENT AND TRADEMARK OFFICE
CERTIFICATE OF CORRECTION

PATENT NO. : 6,109,439
DATED : August 29, 2000
INVENTOR(S) : Ron E. Goade, Sr.

It is certified that error appears in the above-identified patent and that said Letters Patent is hereby corrected as shown below:

Column 4,
Lines 48 and 51, delete the phrase "0.5 mils" and substitute therefore the phrase -- 0.5 mil --.

Column 6,
Line 62, delete the phrase "0.5 mils" and substitute therefore the phrase -- 0.5 mil --.

Column 7,
Line 48, delete the phrase "0.5 mils" and substitute therefore the phrase -- 0.5 mil --.

Column 8,
Line 24, delete the word "about".
Lines 25 and 68, delete the phrase "0.5 mils" and substitute therefore the phrase -- 0.5 mil --.
Line 64, delete the word "is".

Signed and Sealed this

Twenty-ninth Day of June, 2004

JON W. DUDAS
*Acting Director of the United States Patent and Trademark Office*